United States Patent [19]

Volovsek

[11] 4,016,323
[45] Apr. 5, 1977

[54] METHOD AND CONSTRUCTION OF ROOF SYSTEM

[76] Inventor: Anton F. Volovsek, 12214 W. St. Martins Road, Franklin, Wis. 53132

[22] Filed: Sept. 29, 1975

[21] Appl. No.: 617,704

[52] U.S. Cl. .............................. 428/247; 428/315; 428/321; 428/332; 427/373; 52/309.5; 156/78
[51] Int. Cl.$^2$ ..................... B32B 3/26; E04D 11/02
[58] Field of Search .......... 428/315, 321, 247, 332; 427/373; 156/77, 78, 79; 52/309

[56] References Cited

UNITED STATES PATENTS

| | | | |
|---|---|---|---|
| 2,373,317 | 4/1945 | Lawson | 428/321 X |
| 2,999,041 | 9/1961 | Lappala | 428/315 X |
| 3,297,461 | 1/1967 | Siddall | 428/247 X |
| 3,411,256 | 11/1968 | Best | 52/309 X |
| 3,483,664 | 12/1969 | Funk et al. | 52/309 |
| 3,672,951 | 6/1972 | Moore | 428/321 |
| 3,698,927 | 10/1972 | Sawyer | 428/321 X |
| 3,726,754 | 4/1973 | Coglianese et al. | 428/315 X |
| 3,846,524 | 11/1974 | Elmore et al. | 428/315 X |

OTHER PUBLICATIONS

American Roofer and Building Improvement Contractor, "How to Put on a Good Foam Roof," Apr. 1973, pp. 8, 9.

Primary Examiner—Ralph S. Kendall
Attorney, Agent, or Firm—James E. Nilles

[57] ABSTRACT

A roofing system and construction wherein a waterproof membrane consisting of an impervious base sheet being applied directly to the surface of a roof deck. The waterproof membrane is a heavy duty material having a high strength heat resistant mesh throughout and integral in the membrane. This base sheet membrane has a bottom surface of self-adhesive rubberized material and, upon application of the base sheet membrane to the roof deck, results in a permanent bond between the roof deck and the base sheet membrane. An insulation layer of sprayed insulating foam is applied directly to the top of the base sheet membrane and the chemical composition of the spray foam and the chemical composition of the base sheet upper surface further provides for a permanent and continuing bond therebetween upon the application of said insulating foam.

The foam thickness is determined by the specified installation demands for the roof system design. The foam spray insulation provides a substantially seamless insulating layer throughout the roof system.

The top surface of the insulating foam has thereupon applied a weather protective coating and seal such as a hydrocide elastomer, which elastomer is sprayed or brushed on to form a continuous and seamless coating exposed to and protecting the roof system from the weather and external conditions.

The present invention permits application of the base sheet membrane about cut-through stacks and projections of a roof simultaneously with the installation of the roof system in a manner providing a complete water and weather seal about said cut-through and projections in a roof system.

The method of application for this roof system at a roof edge results in a seal of the base sheet membrane and positioning of insulation spray foam material in place on a continuous base for the roof and provides an effective seal after application of a rubberized or vinyl elastomer coating thereon.

19 Claims, 9 Drawing Figures

4,016,323

METHOD AND CONSTRUCTION OF ROOF SYSTEM

BACKGROUND OF INVENTION

This invention relates to a method of construction of a roof system as adapted to new building construction and reroofing requirements.

Present roof designers provide built-up roofing construction, whereby the roof deck supports multiple weatherproof membrane layers of materials. The membrane materials are normally asphaltic felt membranes having bituminous adhesion between and bituminous material providing the adhesion of the lower membrane to the roof deck itself. The multiple layer method provides a minimal insulation; however, such construction elements are unrelated to the insulation property requirements for the roof design.

The requirement for insulated roofs for buildings further demands providing insulation which may be comprised of the various materials, such as styrofoam sheets, plywood sheets or other comparable construction insulation products.

The top surface (exposed) of a normal roof system provides for an asphaltic mastic and granules 24 layer combination which resists the sun's (ultra-violet rays), as well as heat and cold changes which affect the durability of the roof system itself. The IRMA system, substantially shown as U.S. Pat. No. 3,411,256, discloses the method of roof construction adapted by architects and engineers for buildings requiring a warranty as to life for the roof.

Such a system comprises providing a permeable membrane immediately adjacent to the roof deck which normally consists of a plurality of alternating layers of felt and a bituminous material. A thermo-insulating layer is placed over the multiple membranes of felt layers. This insulating layer is, in most instances, both water resistant and, to a degree, water impermeable. A further protective layer of mastic and granules is applied to provide the top exterior surface of the finished roof.

The present concern in the industry and among property owners for providing a roof having characteristics for a long period of quality retention, with limited repair needs, has been accentuated by a number of various serious and expensive roof accidents and fires which have damaged properties and their contents because of inadequate or incorrect roof construction.

SUMMARY OF PRESENT INVENTION

The present invention relates to a roof system design of a type which complies with the demands of the industry and is adapted to a building so as to meet the limitations and requirements set forth by fire insurance regulators, State Industrial Commission orders, municipal laws and regulations and as permitted by present engineering skills. The invention includes a roof system which results in total saving in the design and use of materials for construction of any building utilizing the system in its initial design. The IRMA system's acceptance and provision of its warranty for the owner, when installed by an approved installer with approved materials, has an obvious advantage over a non-warranty construction. Roof systems must provide for precluding damage from wind, hail, water, frost, freezing, heat, fumes of all types, fire and other forces of nature which tend to damage a roof system either over a period of years or in a short term manner. Obvious concern is for the building and the contents thereof being properly protected.

An essential concern to insurance companies and safety organizations is a design of roof system which will clearly prevent serious damage to the building and its contents during a fire. Roof systems, as well as construction of building, requirements are more important today in being constructed so as to prevent injury to fire fighters and to prevent fires or fumes extending uncontrolled throughout sections of buildings.

The present invention, because of its weight in final construction and its method of construction, protects against the elements of concern to the engineer and architects and permits construction of a building requiring less structural steel, smaller footings, thinner (supporting) wall thicknesses than required by a building design utilizing the IRMA or other comparable roof systems. The resulting saving further permits more internal cubic space and square footage, as will be described later herein.

The present invention further permits the remodeling or replacing of roof sections or the cutting in of existing roofs for providing projections therein in a manner and at a cost considerably less than the systems presently utilized for such replacement or cutting.

BRIEF DESCRIPTION OF DRAWINGS

The drawings furnished herewith illustrate the best mode comtemplated by the inventor of carrying out the subject invention in which the above features are fully disclosed, as well as others which will be readily understood from the description of such illustrated embodiments.

In the drawing.

DESCRIPTION OF ILLUSTRATED EMBODIMENT

Figure 1:
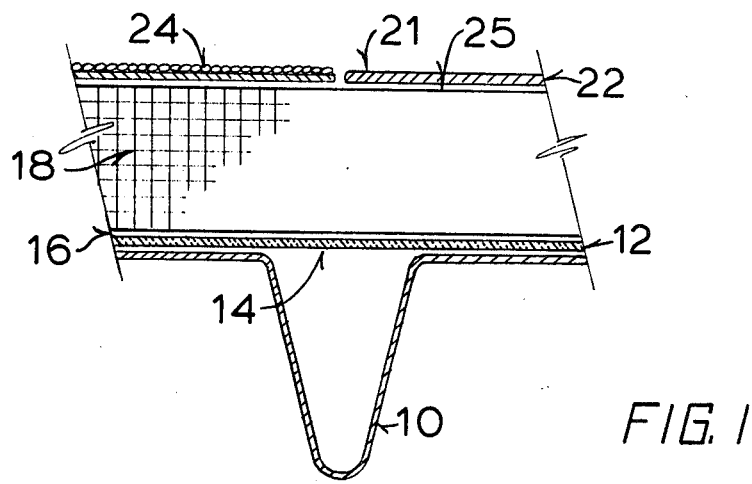
FIG. 1 is a sectional view of a use of the invention in construction of a typical metal deck.
Figure 2:
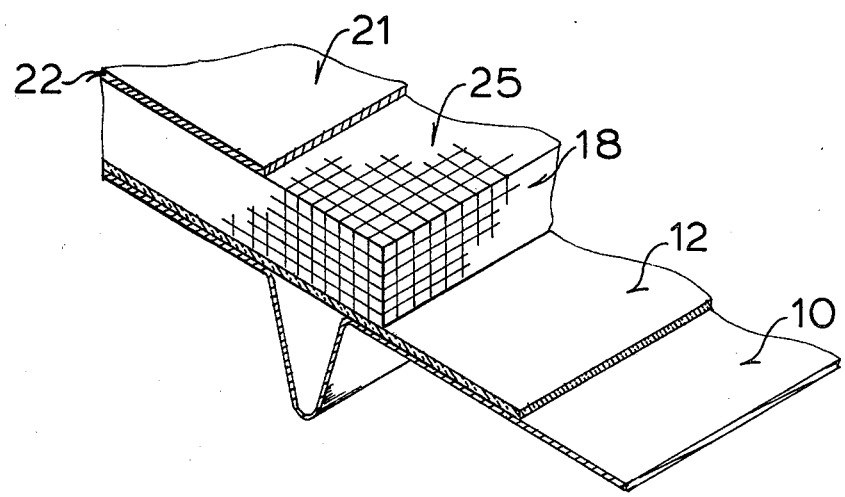
FIG. 2 is a schematic illustration, with portions of the construction removed, to show the roof assembly on the metal deck, similar to FIG. 1.
Figure 3:
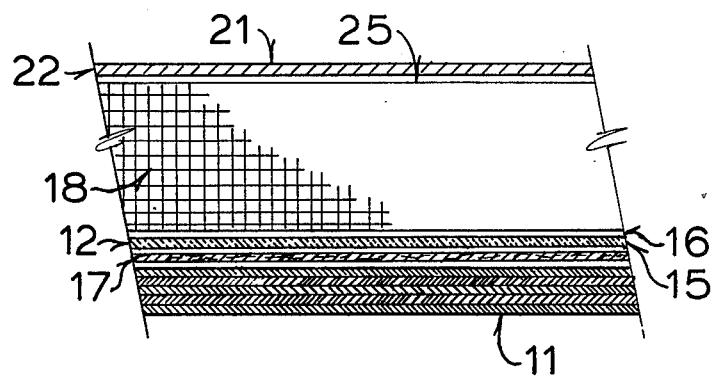
FIG. 3 illustrates a cross-sectional view of a construction detail over a concrete roof deck.
Figure 4:
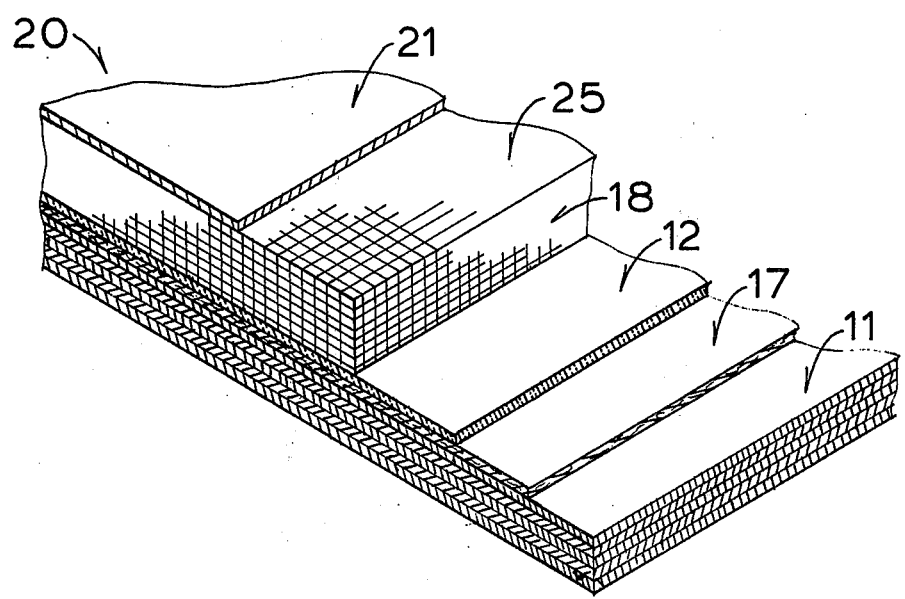
FIG. 4 is a perspective view with parts broken away also illustrating the construction of a concrete or wood deck as cross-sectioned and illustrated in FIG. 3.

Referring to the drawings, and particularly FIGS. 1, 2, 3 and 4, the present invention is illustrated and shows a basic deck, either metal 10 or concrete or wood 11, which comprises the basic support. In the illustrated embodiment, a membrane material 12 of substantial thickness, approximately 0.065 inches, becomes the first layer application. The membrane 12 consists of a mesh 15, such as fibre glass, having on one side thereof (lower) a rubberized asphalt adhesive material 14 which adheres, in a very substantial and permanent manner, to the roof deck (metal 10 or wood or concrete 11). The other side of the mesh 15, its upper surface, consists of a non-tacky bituminous compound 16. The entire membrane 12 is water resistant, heat impervious and has flexibility under varying heat and weather conditions.

The application of the membrane 12 on a roof deck or concrete deck sometimes requires a bituminous primer 17 application to the wood or concrete prior to placement of the membrane 12.

Immediately above the membrane 12 is applied a liquid foam urethane insulation 18. The thickness of the foam is determined by the engineering or architectural requirements as to insulation quality and characteristics demanded by the particular building design. The foam insulation 18 can be applied at approximately 120° F. or under the conditions set forth by the manufacturer of the foam product 18. A requirement, not shown in the illustrations, is the provision in the roof system design 20 of a one-fourth inch per foot slope for the overall finished roof. Where the roof deck 10 or 11 has not been constructed to provide such one-fourth inch to a foot slope, the applicator of the foam insulation material automatically thereby provides, during application such required slope. It is essential in preventing water accumulation, freezing problems and other deteriorating characteristics in roof design to have this required slope to maintain an extended life for the roof system.

Since the spray foam insulation 18 has limited weather resistant characteristics, the top layer 21 of the to be finished system is composed of either a modified urethane elastomer or a hydrocide elastomeric roof material, which elastomer 22 is spray applied, roller applied or brush applied to the entire foam insulation 18. Certain types of elastomers 22, because of the quality or type of foam insulation 18, requires two thin layer applications to eliminate pinholes in the elastomer 22. Such pinholes, over a period time, together with the heat and rays of the sun, cause water, moisture, etc., to deteriorate the final roof surface 22.

In addition, the basic mastic and granules 24 can be applied by the applicator to the upper surface 25 of foam insulation 18 rather than an elastomer 22.

The elastomer 22 should be of such material and have such chemical characteristics as to be integral to the upper surface 25 of the urethane foam 18 when applied and over the life of the roof. Characteristics necessary for such elastomer 22 require a "non-fluid" characteristic under heat, moisture resistance so as to prevent lateral transmission in the membrane 22 at any time, non-shrinking characteristics which prevent ruptures during movement of the roof deck, a material resistant to hardening and becoming brittle due to ultra-violet exposure, and a bonding characteristic to the foam insulation 18 by the elastomer 22, which prevents creeping of the materials after cure.

Such elastomer 22 should be of a material which permits adherence to itself when a repair or construction change affecting the roof is required. The normal elastomer 22 specified will permit application over a range of temperatures from 35° F. to approximately 155° F. This elastomer 22 must have a characteristic of permanent elasticity so as to bridge moving, cracks, joints and flashings. Tests for such elastomer 22 indicate as acceptable erosion rate of less than one-fourth mil per year is required. Further permanent temperature resistance up to approximately 200° F. becomes necessary.

Figure 5:
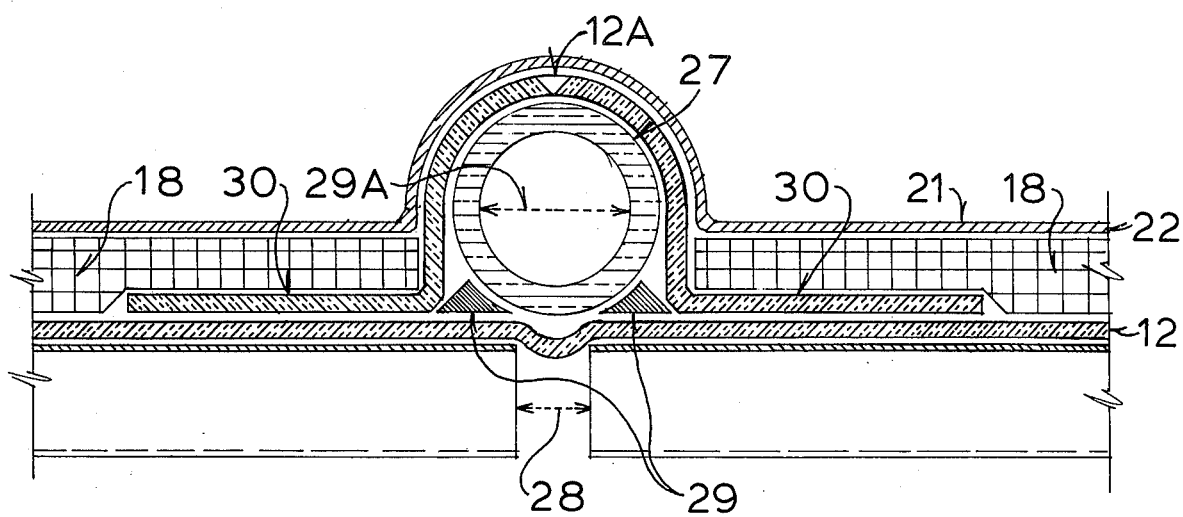
FIG. 5 is a cross-sectional view of a typical roofing expansion joint detail utilizing the system for and over a metal, wood or concrete roof deck.

In FIG. 5 is shown an expansion joint detail wherein a flexible tubing 27 of varying diameter is laid on top of membrane 12 immediately above an expansion joint 28. Tubing mastic 29 applied to membrane 12 secures and holds the flexible tubing to the precise location (above the expansion joint 28) during construction. Said flexible tubing 27 is located prior to application of the foam insulation 18. A second membrane 12A, of the same material and characteristics as membrane 12, overlays the flexible tubing 27 so as to extend to a distance 30 of at least 4 inches (or the diameter 29A of the flexible tubing 27) to each side of the tubing 27. The foam insulation 18 is thereupon applied over membrane 12, layered membrane 12A, to the thickness prescribed. The foam insulation 18 is not applied over the covered flexible tubing 27. The final elastomer 22 application over the foam 18 thereupon becomes a continuous moisture resistant seamless cover over the entire insulated foam 18 and the roof expansion joint.

Figure 6:
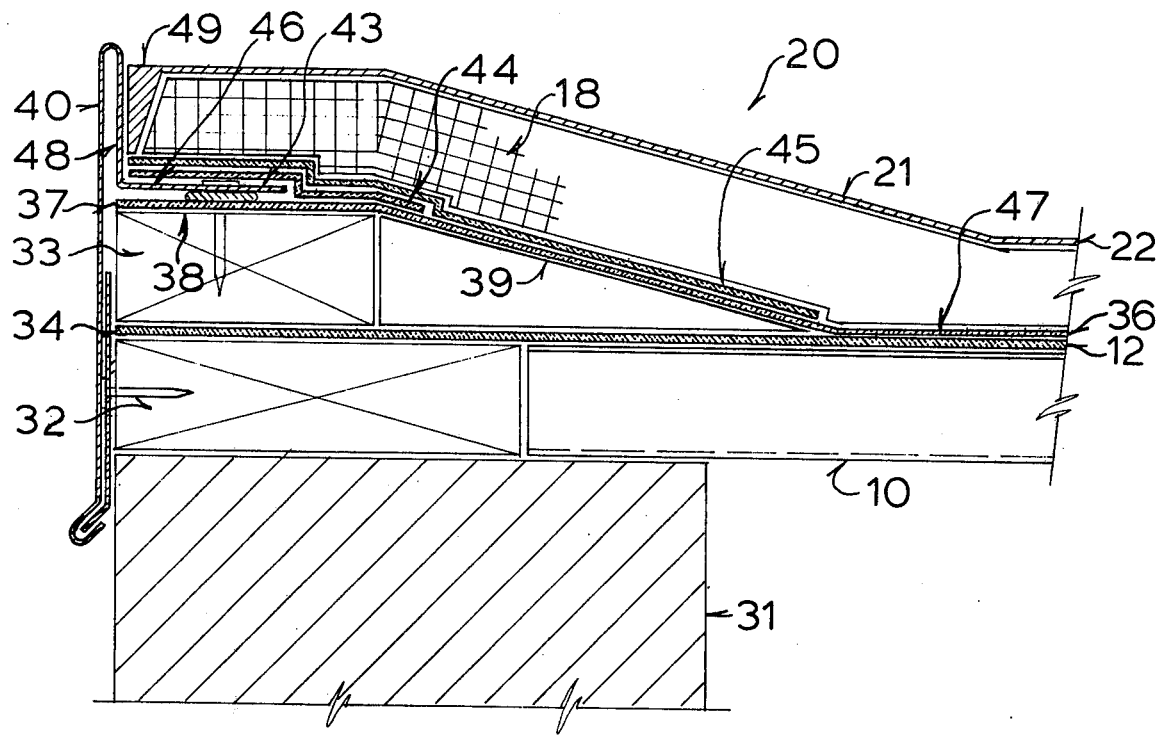
FIG. 6 represents a cross-sectional view of a roof edge detail illustrating the required layments of the present invention, adjacent a building wall edge.

The roof edge detail, FIG. 6, illustrates a deck, as shown, a metal deck 10 resting upon a supporting exterior wall 31 having a wood nailer 32 resting on top of the building wall 31 forming a continuation of the deck 10. A wood 2 inch × 4 inch nailer 33 is necessary to provide a slope to the roof at the roof edge. This nailer 33 is affixed on top of a membrane 12, which membrane 12 extends to the edge 34 of the roof section. A cant 35, either a "new wood cant or nailer" or foam fill 35 is applied adjacent the nailer 33 and extends and provides a slope to the finished roof. Atop the nailer 33 and cant 35 is a membrane 36, having the same characteristics as membrane 12, thereupon applied from the edge 37 over the surface 38 of the nailer 33 and the upper surface 39 of the cant 35 and extends over and is continuous with membrane 12 for a distance of approximately 12 inches out onto the roof. A sheet metal gravel stop 40 is fastened, as at 41, by a nail into the nailer 33 at intervals along the roof edge.

The gravel stop section 43 has overlapping thereon and affixed thereto a membrane 44, which membrane 44 is of the same material and characteristics as membrane 12 and extends and overlaps 3 to 4 inch section of membrane 36. A further membrane 45, having characteristics similar to membrane 12, is applied to overlap an exposed portion of gravel stop section 43, as at 46, the membrane 44, in its entirety, then further adheres to section 47 of the upper surface of membrane 36. The gravel stop 40 extends, as at 48, to form a vertical wall. Spray foam 18 is thereupon applied to the entire roof section so as to adhere to the gravel stop section 48 and be applied and slope substantially over cant 35, as provided, and is applied so as to cover the entire remaining roof. The final finish mastic and granules 24 and/or elastomer 22 is then applied to the top surface of the foam 18 and the elastimer 22 or mastic and granules 24 is so applied as to fill and provide moisture control on a permanent basis between the foam 18 and the sheet metal gravel stop section 48. Such fill, as at 49, is a continuation of either mastic and granules 24 or elastomer 22.

Figure 8:
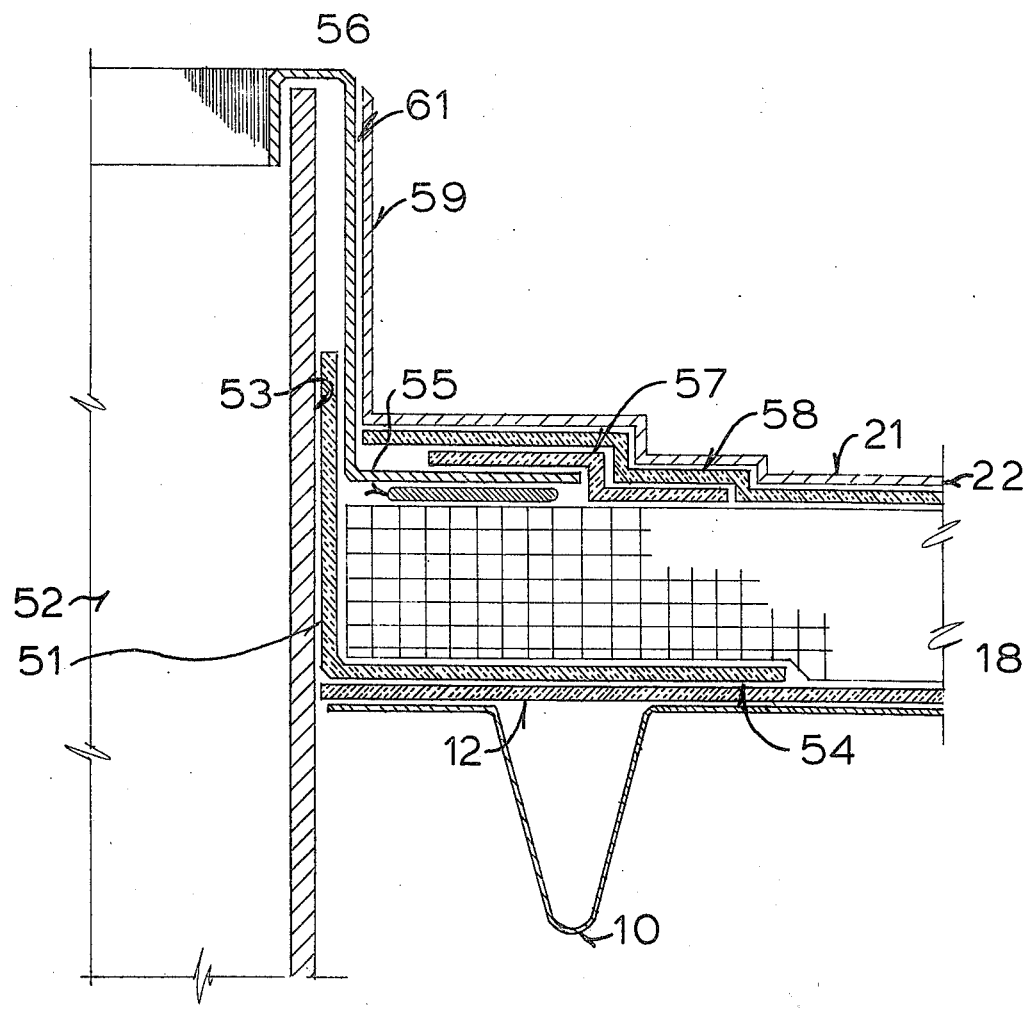
FIG. 8 is a cross-sectional view of the roof's system wherein a "cut through" detail is provided which illustrates a roof vent stack installation within the present roof system design.

The roof vent stack design, as shown in FIG. 8, illustrates the application of membrane 12 and the use of a primer 17 (for adhesion of membrane 12) directly to the metal roof deck 10. A membrane section 51 extends verically and horizontally and is adhered to the stack 52 along its edge portion 53. This membrane section 51 extends 4 to 6 inches above the roof deck 10 and about the entire vent stack 52. This membrane 51 further extends along membrane 12 as at 54 a distance so as to overlap membrane 12 4 to 6 inches. The foam insulation 18 is thereupon applied to the thickness required. A mastic (caulking type) 55 is applied to the surface of the foam 18 around the vent stack. This mastic 55 permits adhesion of a lead flashing 56, which is cut from sheets and formed to fit the vent stack 52 in the manner shown. A membrane stripe 57, approximately 4 6 inches in width, encircles and adheres to the lead flashing 56. Immediately above and adhering thereto is an applied membrane 58 which is the elastomer 22 extending in a continuous sheet form over the entire roof (insulation foam 18) section. A further joint and moisture resistive layer, elastomer layer 59, extends to form a bond to the elastomer 58 along area section 60 and protruding lead flashing 56, as at 61. The elastomer layer 59 adheres tightly and permanently to the flashing 56 and the continuous elastomer membrane 58 providing the external seal for the roof vent stack 52.

The present invention was designed as a total "roof system" in that the weight of a roof system obviously directly affects the thickness of supporting walls, the dimension of steel for the roof deck or thickness for concrete for a supporting roof slab, as well as dimension requirements of footings for the entire building. The present invention, roof system, using an elasomer 22, as described herein, has a weight of approximately 1.56 per sq. foot over the roof deck (using an elastomer 22 rather than mastic and granules), whereas, the IRMA system has a weight of approximately 12.8 per sq. foot. A regular built-up roof using 2" fiber board insulation, such as Celatex, etc., has an 8.63 per sq. foot weight for a comparable insulation speced roof system. Thus, a Square (10 × 10 feet section) of roof IRMA system has an approximately 1,280 weight, a built-up roof system has a weight of approximately 863 per Square and the present invention Roof System is approximately 156 for a full Square. The statistics, as to weight, reflect designed roofs having comparable U-value characteristics.

The resultant saving of weight through use of lighter materials, the roof system herein disclosed permits engineering design of a building whereby the wall thickness requirement is less for supporting a lower weight roof for a roof deck (metal, concrete or otherwise), which is designed for the normal snow, wind loads, but for a dead-weight roof load of substantially less than the load weight demands of an IRMA of "Standard Built-Up" roof system.

The obvious saving in material costs, weight problems, concern for foundation, footing and load limits of ground materials becomes an extremely important advantage. An overall design using the present roof system, in addition to reducing cost, provides a more substantial, less expensive building. The reduction in thickness of walls, depth of purlins and deck accommodates and provides cubic space usage internally which exceeds that of the normal construction design provided by the existing roof systems.

Engineers, in designing buildings using the present invention system, can utilize materials which better suit preventing problems caused by moving at roof, cracks, joints and flashings. The elastomer 22 should have a minimum spray or roller application thickness of approximately 40 mils. As indicated previously, certain make spray foam 18, having pinholes, might require a double application in thinner mils of thickness for the elastomer 22. The resultant multiple layers should provide approximately 40 mils total thickness.

The present invention permits roof system design and construction whereby materials being used in the construction do not require the use of expensive asphalt heating equipment. Many municipalities require special permits for tar or asphalt heating equipment and in several municipalities penalties are assessed on a daily basis for such use.

Related to the present invention, it is important to note that a typical roof system of 4-ply built-up felt and asphalt with gravel topping over 2 layers of three-fourth inch rigid fiberboard insulation on a metal deck has a resultant total "R" value and a "U" value of 0.1893. The IRMA roof system having gravel on its 1 inch styrofoam "R" on felt membrane and one-half inch rigid fiberboard on metal deck has a total "R" value of 6.50 and a "U" value of 0.1538.

The present invention, roof system, having a spray on elastomer topping over a 1 inch thick spray urathene ("R" value of 8.33) over vapor barrier has a total "R" value of 9.68 and a "U" value of 0.103. Where in the present invention a 1-½ inch Fesco-foam board is substituted for the spray on insulation, the total "R" is 7.78 and the "U" value is 0.1285.

In the trade, Fesco-foam is a rigid board of three-fourth inch fiberboard with styrofoam laminated to the top, having a thickness as required for the specific job.

Figure 9:
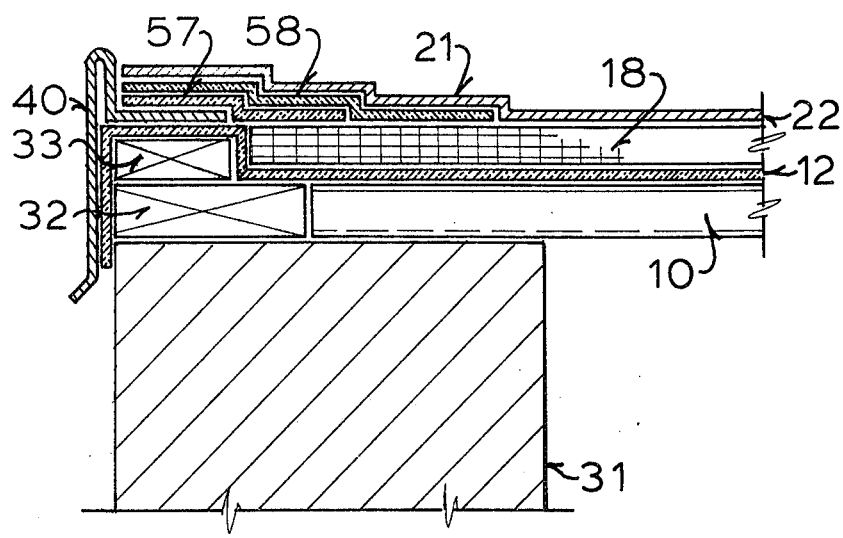
FIG. 9 is a cross-sectional view of a further embodiment of the present invention wherein the required layments are shown in an exaggerated manner to illustrate composition of construction.

As in FIG. 9, the roof deck 10 rests on the supporting wall 31 and provides for a first membrane 12 extending over the roof deck 10 portion of the board 32 and the nailer 33, then extends beyond the edge down and over the edges of both the nailer and the board 32 to overlap a portion of the exterior wall 31. The spray foam 18 is thereupon applied to the thickness desired and the metal gravel stop 40 is fastened to the nailer 33.

Because of weather changes to prevent expansion and contraction problems and possible cracking of the roof materials, a membrane 57 is applied so as to overlap the sheet metal roof stop and the spray foam 18. A second membrane 58 is thereupon applied over membrane 57 so as to overlap totally membrane 57 and to further overlap a section of the spray foam 18.

The final topping or roofing is an elastomer 22 and the top surface or the layer 21 is exposed to the elements as the initial protection to the total roof system. The method of application of this roof system revolves around adapting to the roof deck 10 or 11 of whatever material the roof deck is composed, the first membrane 12 having a tacky, self-adhering material on its surface brought in contact with the originally exposed roof deck 10 or 11. The membrane 12 further having a strengthening mesh 15 and a top elastic, non-sticky, rubberized material which has properties compatible with the chemical composition of the urathene spray foam insulation 18. This chemical composition characteristic provides an automatic, immediate and permanent bond between the spray foam insulation 18 and the non-tacky bituminous surface compound 16 comprising a portion of membrane 12. The membrane 12 may be comprised of rolls of material having a removable protection sheet adhering to the rubberized asphalt self-adhesive material 14. The applicator, as the rolls are unrolled, removes the protective sheet and covers rows at a time and each roll overlaps 2 to 3 inches as the rolls of membrane 12 are applied. The tacky, self-adhesive portion 14 is always applied directly to the roof deck 10 or 11. Likewise, this membrane 12 is laid in a direction from the low part of the roof to the high side of the roof. The edges of each roll are made to overlap approximately 2-½.

In construction, the requirement normally arises for the provision of a temporary roof while other trades are completing their portions of the building. The present roofing system permits the complete application of the first membrane 12 for such temporary roofing period and at a later date a roofing contractor will complete application of the spray foam 18 and successive top layer 22.

An important part of the invention relates to the particular method of applying the materials to the roof at a roof edge area, as shown in FIGS. 6, 7, 8 and 9.

The detail of the invention shown in FIG. 6 illustrates membrane 12 being first applied to the roof deck 10 and board 32 up to the edge 34 thereof. Thus, the membrane 12 overlaps the joint between the wood board 32 and deck 10. The nailer 33 is secured in a standard manner to the top surface of the membrane 12. A cant 35 of fiber or foam then is inserted or applied so as to provide a gradual slope between the roof upper surface and the top surface of the wood nailer 33. A membrane 36 is applied so as to overlap portions of membrane 12, the cant 35 and the sheet metal gravel stop 40, which has been nailed to the wood nailer 33. A mastic 43 can be applied between the sheet metal gravel stop 40 and the membrane 36 to provide a further moisture seal.

Subsequent application of the spray foam 18 and elastomer 22 completes the roof system. As in FIG. 6, a wedge 49 of elastomer can be applied between the sheet metal gravel stop 40 and the spray foam 18.

Figure 7:
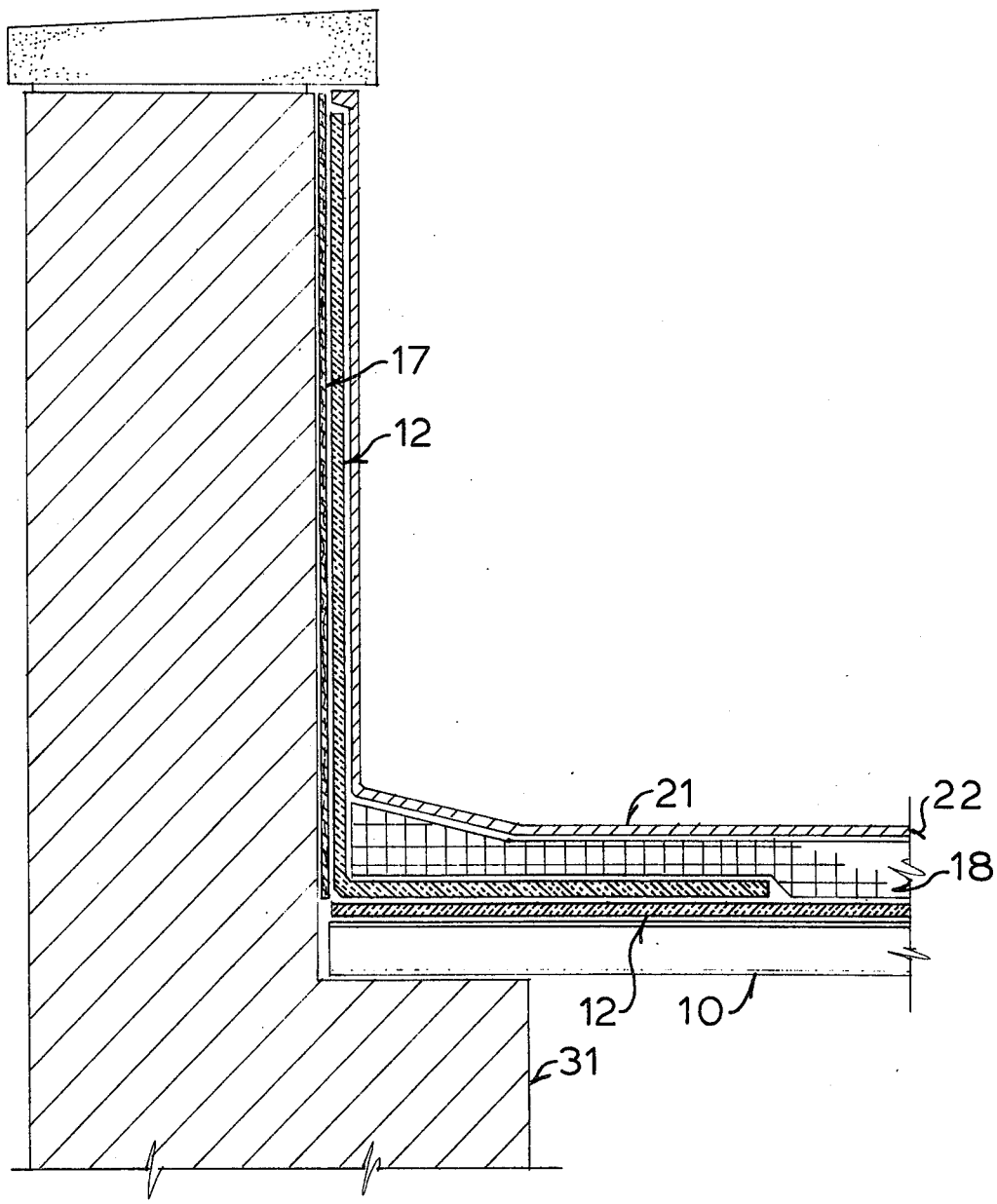
FIG. 7 represents a cross-sectional view of construction for the roof system adjacent a standard parapet wall.

The design requirements, as shown in FIG. 7, for a section or roof adjacent a vertical wall require a membrane 12 being applied to the roof deck 10 and a bituminous primer 17 is sprayed to brushed on the vertical section of the wall and a second membrane 12A is applied to overlap a substantial portion of the first membrane 12 and the primed wall section. Then application of the elastomer 22 to the flat portion of the roof over the spray foam 18 and membrane 12A provides a continuous sheet and a leak preventing top suface seal 21.

A cant or slope would be formed during the foam application 18 so as to prevent pockets forming at the juncture of the vertical wall section and flat roof section of the completed roof system.

The particular design of the roof system, as shown in FIG. 8, illustrates the preferred embodiment of the invention as to the method of application of materials for a cut-through in the roof in a joint other than an edge of the roof. This would be a detail illustrating the embodiment of the invention for a vent stack or similar cut-through, such as a vent, skylight, etc., commonly found in construction and required as projecting elements through the top surface of a roof. As in FIG. 8, this complete seal system prevents deterioration or cracking of the sealing layer membranes 22, 57, and 58. This design may be modified to eliminate a double layer, such as at 57 and 58. However, such a modification would provide for a single membrane, thereby eliminating the need for membrane 57.

In the preferred embodiment, the membrane 12 consists of rolls of heavy duty material interwound and of such width and weight as to permit easy handling by the installers. However, rolls of said membrane material 12 can be of such widths as to be applied by applicators and machinery.

The membrane 12 having a puncture resistive characteristic developed by the mesh 15 and its other properties further has a pliable characteristic which, during extreme temperature variation conditions, because of its tensile strength, resists puncture, ripping or damage. This membrane 12 further is of such thickness and tensile strength as to permit applicators walking thereon without resultant construction damage.

The flexibility of the membrane 12 over the variation in range of temperatures permits a continuing bond at its upper surface 16 and the spray foam 18 during variation in temperatures. It is obvious that buildings, air-conditioned internally, can cause extreme temperature variations in the roof system during hundred degree and above temperatures on the outside of the building.

The rolls of membrane 12 are applied in normally parallel manner with an overlap of 2 to 3 inches so that the overlap provides for the applied membrane 12 to be a continuous water-tight membrane. In application over cracks, gaps, holes and other puncture causing conditions, the membrane 12 is of such characteristic as to preclude permanent or serious damage during application and, subsequently during weather varying conditions. The membrane 12 precludes the need for hot kettles and warming ovens during application of membrane 12.

An elastomer 22 has an elongation characteristic of at least 500% thereby providing for the stretching characteristics necessary during extreme heat variations and from expansion and contraction of portions of the roof system and, in particular, parapet wall junction sections and cut-throughs in the roof itself.

To insure an application and roof system which can be guaranteed over a period of years, as many timer required by architects, the membrane 12 is rolled by a heavy roller throughout its surface after application. This rolling process insures bonding of membrane 12 to the roof deck, precluding the problems of wind, damage and uplifting of roof portions caused by wind.

Various modes of carrying out the invention are contemplated as being within the scope of the following claims, particularly pointing out and distinctly claiming the subject matter which is regarded as the invention.

I claim:

1. A method of preparing a building roof system having on its roof deck a prepared upper surface thereon, consisting of applying and affixing an impervious high strength heat resistant single sheet membrane to the adhesive primer and throughout the entire roof deck so as to tightly and completely adhere the membrane to the roof deck, said membrane having a self-adhering adhesive substance on its lower surface for effecting the adhesion of said membrane to said upper surface of said deck and having its upper surface adapted for bonding to insulating foam, said membrane having integral therein a supportive and strengthening mesh throughout and said mesh further being substantially intermediate of the surfaces of the membrane, applying directly to the top surface of the affixed and placed membrane a spray insulating foam to produce when set an even distribution of rigid urethane of a predetermined thickness, said urethane thickness being related to specific requirements of a specified U-factor for said roof system and having an exposed upper surface, subsequently applying directly to the exposed surface of the set urethane insulation a liquid sealant to a thickness exceeding 40 mils and which coats the entire exposed set insulation surface and provides a seamless film having a thickness when set which becomes a waterproof weather protecting surface final coating for the roof system.

2. The method of claim 1., including applying and affixing the single sheet membrane to the upper surface of the roof deck from rolls of material applied in successive parallel slightly overlapping rows.

3. The method of claim 1., including rolling the single sheet membrane with a weighted roller subsequent to placing and adhering of the membrane to the upper surface of the roof deck.

4. A method according to claim 1 including the step of applying a primer sealant coat to said roof deck prior to affixing said membrane.

5. A method of preparing a building roof system having a building parapet wall consisting essentially of applying, beginning at the low point of the roof deck, sheet rolls of an impermeable rubberized membrane, applying the rolls of membrane in an overlapping manner of a sufficient number of inches of overlap to provide a bond between the successive rows of overlapping membrane, the membrane having an adhesive material on its lower surface as applied and adhering to the exposed upper surface of the roof deck and forming a permanent bond between the roof deck and membrane, said membrane having integral therein a supportive and strengthening mesh throughout and said mesh further being substantially intermediate of the surfaces of the membrane, applying continuously from the successive rows of overlapping membrane affixed to the roof deck in an overlapping manner the membrane along and up the surface of the parapet wall and thereby forming a continuous overlapping series of rows of membrane which become the intitial layer for the roof system, then applying directly to the top surface of the membrane a spray insulating foam to form a continuous monolithic insulating layer over the roof deck area and onto and abutting the membrane extending and affixed to the surface of the parapet wall, the spray foam insulation being applied in a thickness and manner to result in the top foam surface having a minimum slope of one-fourth inch per foot from the low level of the roof to the high point of the roof preventing pocket formations in the finished upper surface, then applying directly to the exposed surface of the spray foam insulation a liquid sealant elastomer which is applied to the entire exposed set foam surface providing a seamless water impermeable membrane exposed to the weather, the liquid sealant elastomer being applied in a continuous application over the spray foam and on up and onto the parapet wall, thereby providing a continuous impermeable coating and seal for the roof and junction of the roof deck with the parapet wall.

6. A method of claim 5., wherein the adhesive material has characteristics for a tight bond between the upper surface of the roof deck and the membrane and further permits a pliability and expansion of the membrane during temperature variations without damage to the bond therebetween.

7. The method of claim 5., including the elastomer having elongation characteristics in excess of 500% of its thickness and further having ultra-violet resistant qualities.

8. The method of claim 5., wherein, during the application of the spray foam insulation, a cant is formed at the juncture of the parapet wall and the roof section whereby pocket information problems are precluded in the finished roof system.

9. The method of claim 5., wherein, during application of the spray foam insulation, the applicator forms the thickness of the insulation so as to provide a successive minimum slope of one-fourth per foot from the predetermined low point of the roof system to the other surfaces thereof, wherein pocket formations in the finished roof system are prevented.

10. A method of fabricating a roof system on a roof deck comprising the steps of:
providing a water impervious flexible membrane having a self-adhesive on one side;
affixing said membrane to said deck by means of said adhesive;
applying a layer of insulating foam in liquid form on top of said membrane;
allowing said foam to solidify and become bonded to said membrane; and
applying a layer of elastomeric water impervious material to the upper surface of the solidified foam.

11. A method of preparing a building roof system having on its roof deck a prepared upper surface thereon, consisting of applying and affixing an impervious high strength heat resistant single sheet membrane to the adhesive primer and throughout the entire roof deck from rolls of material applied in successive parallel slightly overlapping rows so as to tightly and completely adhere the membrane to the roof deck, said membrane having integral therein a supportive and strengthening mesh throughout and said mesh further being substantially intermediate of the surfaces of the membrane, said membrane having on its lower surface an adhering material which immediately adheres to the upper surface of the roof deck as the membrane is unrolled and laid upon the roof deck, applying directly to the top surface of the affixed and placed membrane a spray insulating foam to produce when set an even distribution of rigid urethane of a predetermined thickness, said urethane thickness being related to specific requirements of a specified U-factor for said roof system and having an exposed upper surface, subsequently applying directly to the exposed surface of the set urethane insulation a liquid sealant to a thickness exceeding 40 mils and which coats the entire exposed set insulation surface and provides a seamless film having a thickness when set which becomes a waterproof weather protecting surface final coating for the roof system.

12. An improved roof system comprising a roof deck, said roof deck having a lower surface and an upper surface, a high strength flexible membrane applied and adhering to the upper surface of the roof deck to form a continuous membrane thereupon, self-adhering adhesive means on the lower surface of said membrane for forming adhesion between the membrane and the upper surface of the roof deck, said membrane having integral therein a supportive and strengthening mesh throughout and said mesh further being substantially intermediate of the surfaces of the membrane, a continuous spray foam insulation layer immediately on top of the membrane and having bonding characteristics to form a permanent bond between said spray foam layer and the upper surface of the membrane, an elastic coating applied to the upper surface of the spray foam and covering the entire upper surface thereof and said coating having permanent stretching characteristics and being a material resistive to normal atmospheric conditions and erosion problem characteristic to exposed roof surfaces.

13. The roof system as defined in claim 12., wherein the means for forming the adhesion between the membrane and upper surface of the roof deck comprises a self-adhesive bonding material formed integral with the membrane.

14. The roof system as defined in claim 12., wherein the flexible membrane has puncture resistive properties and is pliable during temperature varying conditions, and wherein the elastic coating has a stretching characteristic in excess of 500% of its thickness.

15. The roof system as defined in claim 12., wherein the roof deck is constructed to have a minimum slope from its low point throughout thereof of one-fourth inch slope per foot to preclude pocketing of ice or water on the top finished surface of the roof system.

16. The roof system as defined in claim 12., wherein the flexible membrane is comprised of successive rolls of material applied in an overlapping relation, said overlapping of rolled membrane material being of such overlapping width as to provide a permanent moisture resistive seal for the applied membrane strips.

17. A roof system comprising:
a roof deck having an upper surface;
a flexible water impervious membrane overlying said deck and comprising a supportive and strengthening mesh having a self-adhering adhesive substance on its lower surface for effecting adhesion of said membrane to said upper surface of said deck and having its upper surface adapted for bonding to insulating foam;
a rigid layer of insulating foam foamed in situ overlying said membrane and having its lower surface bonded to said upper surface of said membrane; and
a layer of elastomeric material overlying and adhering to the upper surface of said rigid layer of insulating foam.

18. A system according to claim 17 wherein said adhesive substance is rubberized self-adhesive asphalt.

19. A system according to claim 18 wherein said membrane is approximately .065 inches thick.

* * * * *